(12) United States Patent
Takimoto et al.

(10) Patent No.: US 11,521,843 B2
(45) Date of Patent: Dec. 6, 2022

(54) SAMPLE SUPPORT, SAMPLE IONIZATION METHOD, AND MASS SPECTROMETRY METHOD

(71) Applicant: HAMAMATSU PHOTONICS K.K., Hamamatsu (JP)

(72) Inventors: Miu Takimoto, Hamamatsu (JP); Takayuki Ohmura, Hamamatsu (JP); Masahiro Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/262,596

(22) PCT Filed: Jun. 19, 2019

(86) PCT No.: PCT/JP2019/024361
§ 371 (c)(1),
(2) Date: Jan. 22, 2021

(87) PCT Pub. No.: WO2020/026629
PCT Pub. Date: Feb. 6, 2020

(65) Prior Publication Data
US 2021/0257201 A1 Aug. 19, 2021

(30) Foreign Application Priority Data
Jul. 30, 2018 (JP) .............................. JP2018-142328

(51) Int. Cl.
*H01J 49/04* (2006.01)
*H01J 49/00* (2006.01)

(52) U.S. Cl.
CPC ...... *H01J 49/0418* (2013.01); *H01J 49/0031* (2013.01); *H01J 49/0409* (2013.01)

(58) Field of Classification Search
CPC . H01J 49/0409; H01J 49/0418; H01J 49/0031
See application file for complete search history.

(56) References Cited

U.S. PATENT DOCUMENTS

| | | | | |
|---|---|---|---|---|
| 7,619,215 B2 * | 11/2009 | Kim | .................... | H01J 49/0418 422/50 |
| 8,237,114 B2 * | 8/2012 | Okuno | ................ | H01J 49/0418 250/281 |

(Continued)

FOREIGN PATENT DOCUMENTS

| | | |
|---|---|---|
| JP | 2009-504161 A | 2/2009 |
| JP | 2010-71727 A | 4/2010 |

(Continued)

OTHER PUBLICATIONS

International Preliminary Report on Patentability dated Feb. 11, 2021 for PCT/JP2019/024361.

*Primary Examiner* — Wyatt A Stoffa
(74) *Attorney, Agent, or Firm* — Faegre Drinker Biddle & Reath LLP

(57) ABSTRACT

A sample support is a sample support for sample ionization, including: a substrate formed with a plurality of through holes opening to a first surface and a second surface on a side opposite to the first surface; a conductive layer provided not to block the through hole in the first surface; and a reinforcement member disposed inside a part of the plurality of through holes.

6 Claims, 12 Drawing Sheets

(56) References Cited

U.S. PATENT DOCUMENTS

| | | | |
|---|---|---|---|
| 9,870,907 B2* | 1/2018 | Pawliszyn | B01J 20/286 |
| 10,224,195 B2* | 3/2019 | Naito | H01J 49/26 |
| 10,224,196 B2* | 3/2019 | Giles | H01J 49/062 |
| 11,017,993 B2* | 5/2021 | Schürenberg | G01N 1/2813 |
| 11,170,985 B2* | 11/2021 | Naito | G01N 33/6851 |
| 2002/0160536 A1* | 10/2002 | Regnier | B01L 3/5027 |
| | | | 436/518 |
| 2010/0140160 A1* | 6/2010 | Dubrow | B01J 20/28007 |
| | | | 210/348 |
| 2017/0358436 A1* | 12/2017 | Naito | G01N 27/62 |
| 2020/0386712 A1* | 12/2020 | Naito | G01N 27/62 |

FOREIGN PATENT DOCUMENTS

| | | | | |
|---|---|---|---|---|
| JP | 2010-175338 A | 8/2010 | | |
| JP | 5129628 B2 | 1/2013 | | |
| JP | 2013-228403 A | 11/2013 | | |
| JP | 2014-153183 A | 8/2014 | | |
| JP | 2017-004786 A | 1/2017 | | |
| JP | 6093492 B1 | 3/2017 | | |
| JP | 2017-122732 A | 7/2017 | | |
| WO | WO-2007/022026 A2 | 2/2007 | | |
| WO | WO-2017038709 A1 * | 3/2017 | | G01N 1/2806 |

\* cited by examiner

SAMPLE SUPPORT, SAMPLE IONIZATION METHOD, AND MASS SPECTROMETRY METHOD

TECHNICAL FIELD

The present disclosure relates to a sample support, a sample ionization method, and a mass spectrometry method.

BACKGROUND ART

In the related art, a sample support for ionizing a sample in mass spectrometry of a sample such as a biological sample is known (for example, refer to Patent Literature 1). Such a sample support includes a substrate formed with a plurality of through holes opening to a first surface and a second surface on a side opposite to the first surface. In a case where the sample support is disposed on the sample such that the second surface faces the sample, it is possible to lift up the sample from the second surface side of the substrate toward the first surface side through the through hole by using a capillary action. Then, in a case where the first surface side, for example, is irradiated with an energy ray such as laser beam, the sample moved to the first surface side is ionized.

CITATION LIST

Patent Literature

Patent Literature 1: Japanese Patent No. 6093492

SUMMARY OF INVENTION

Technical Problem

In the sample support as described above, in order to accelerate the movement of the sample by the capillary action through the through hole from the second surface side of the substrate to the first surface side, the substrate may be required to be thin. However, in a case where the substrate becomes thin, for example, the substrate is easily bent, and the strength decreases. As a result thereof, there is a concern that the substrate is easily broken.

Therefore, an object of one aspect of the present disclosure is to provide a sample support, a sample ionization method, and a mass spectrometry method on which the breakage of a substrate is suppressed.

Solution to Problem

A sample support according to one aspect of the present disclosure is a sample support for sample ionization, including: a substrate formed with a plurality of through holes opening to a first surface and a second surface on a side opposite to the first surface; a conductive layer provided not to block the through hole in the first surface; and a reinforcement member disposed inside a part of the plurality of through holes.

In the sample support, the plurality of through holes opening to the first surface and the second surface on a side opposite to the first surface are formed on the substrate. For this reason, for example, in a case where the sample support is disposed on a sample such as a biological sample such that the second surface of the substrate faces the sample, it is possible to move the sample (a component of the sample) toward the first surface side from the second surface side through the through hole, by using a capillary action. Further, for example, in a case where the first surface is irradiated with an energy ray such as laser beam, the energy is transmitted to the component of the sample moved to the first surface side via the conductive layer, and thus, it is possible to ionize the component of the sample. In addition, the reinforcement member is disposed inside a part of the plurality of through holes. For this reason, the substrate is reinforced by the reinforcement member. Accordingly, the substrate is less likely to be bent. Accordingly, according to such a sample support, it is possible to suitably ensure the strength of the substrate and to suppress the breakage of the substrate.

A width of the through hole may be 1 nm to 700 nm, and a thickness of the substrate may be 1 µm to 50 µm. In this case, it is possible to suitably attain the movement of the component of the sample by the capillary action described above.

A material of the reinforcement member may be a resin. In this case, it is possible to easily form the reinforcement member.

A material of the reinforcement member may be a metal. In this case, when the component of the sample is ionized, the generation of organic gas is suppressed, and thus, a noise in a detection result of the component of the ionized sample is reduced.

The substrate may include a reinforcement region including a plurality of the through holes and a measurement region including a plurality of the through holes, the reinforcement member may be disposed inside the plurality of through holes in the reinforcement region, and the reinforcement member may not be disposed inside the plurality of through holes in the measurement region. In this case, the reinforcement member is disposed inside the plurality of through holes in the reinforcement region, and thus, the substrate is less likely to be bent. Accordingly, it is possible to further ensure the strength of the substrate and to further suppress the breakage of the substrate.

The reinforcement region may include at least a region continuous from one end of the substrate to the other end opposite to the one end when viewed in a thickness direction of the substrate. In this case, the substrate is less likely to be bent. Accordingly, it is possible to more reliably ensure the strength of the substrate and to more reliably suppress the breakage of the substrate.

The reinforcement region may surround each of a plurality of the measurement regions when viewed in the thickness direction of the substrate. In this case, in each of the plurality of measurement regions, it is possible to ionize each component of a plurality of samples.

A sample support according to another aspect of the present disclosure is a sample support for sample ionization, including: a substrate having conductivity and formed with a plurality of through holes opening to a first surface and a second surface on a side opposite to the first surface; and a reinforcement member disposed inside a part of the plurality of through holes.

According to such a sample support, it is possible to omit the conductive layer and to obtain the same effects as those of the sample support including the conductive layer described above.

A sample ionization method according to one aspect of the present disclosure, includes: a first step of preparing a sample and the sample support including the conductive layer; a second step of disposing the sample support on the sample such that the second surface faces the sample; a third step of peeling off the sample support from the sample; and a fourth step of ionizing a component of the sample moved to the first surface side through the through hole in which the reinforcement member is not disposed among the plurality of through holes, by irradiating the first surface with an energy ray while applying a voltage to the conductive layer.

In the sample ionization method described above, the plurality of through holes opening to the first surface and the second surface on a side opposite to the first surface are formed on the substrate. In a case where the sample support is disposed on the sample such that the second surface of the substrate faces the sample, the sample (the component of the sample) is moved toward the first surface side from the second surface side through the through hole by the capillary action. Further, the sample support is peeled off from the sample, and then, in a case where the first surface is irradiated with an energy ray while a voltage is applied to the conductive layer, the energy is transmitted to the component of the sample moved to the first surface side. Accordingly, the component of the sample is ionized. In addition, in such a sample ionization method, the reinforcement member is disposed inside a part of the plurality of through holes. For this reason, the substrate is reinforced by the reinforcement member. Accordingly, the substrate is less likely to be bent, and thus, in the third step, the breakage of the substrate when the sample support is peeled off from the sample is suppressed. Accordingly, according to such a sample ionization method, it is possible to ionize the component of the sample while suppressing the breakage of the substrate, by using the substrate of which the strength is suitably ensured.

A sample ionization method according to another aspect of the present disclosure, includes: a first step of preparing a sample and the sample support including the substrate having conductivity described above; a second step of disposing the sample support on the sample such that the second surface faces the sample; a third step of peeling off the sample support from the sample; and a fourth step of ionizing a component of the sample moved to the first surface side through the through hole in which the reinforcement member is not disposed among the plurality of through holes, by irradiating the first surface with an energy ray while applying a voltage to the substrate.

According to such a sample ionization method, in the case of using the sample support in which the conductive layer is omitted, it is possible to obtain the same effects as those in the case of using the sample support including the conductive layer as described above.

In the third step, the sample support may be peeled off from the sample before the component attached to the substrate is dried. In this case, it is possible to more smoothly peel off the sample support from the sample before the sample support and the sample are firmly fixed.

A mass spectrometry method according to one aspect of the present disclosure, includes: each of the steps of the sample ionization method described above; and a fifth step of detecting the component ionized in the fourth step.

According to the mass spectrometry method described above, it is possible to perform mass spectrometry of the sample while suppressing the breakage of the substrate, by using the substrate of which the strength is suitably ensured.

Advantageous Effects of Invention

According to one aspect of the present disclosure, it is possible to provide a sample support, a sample ionization method, and a mass spectrometry method in which the breakage of the substrate is suppressed.

DESCRIPTION OF EMBODIMENTS

Figure 1:
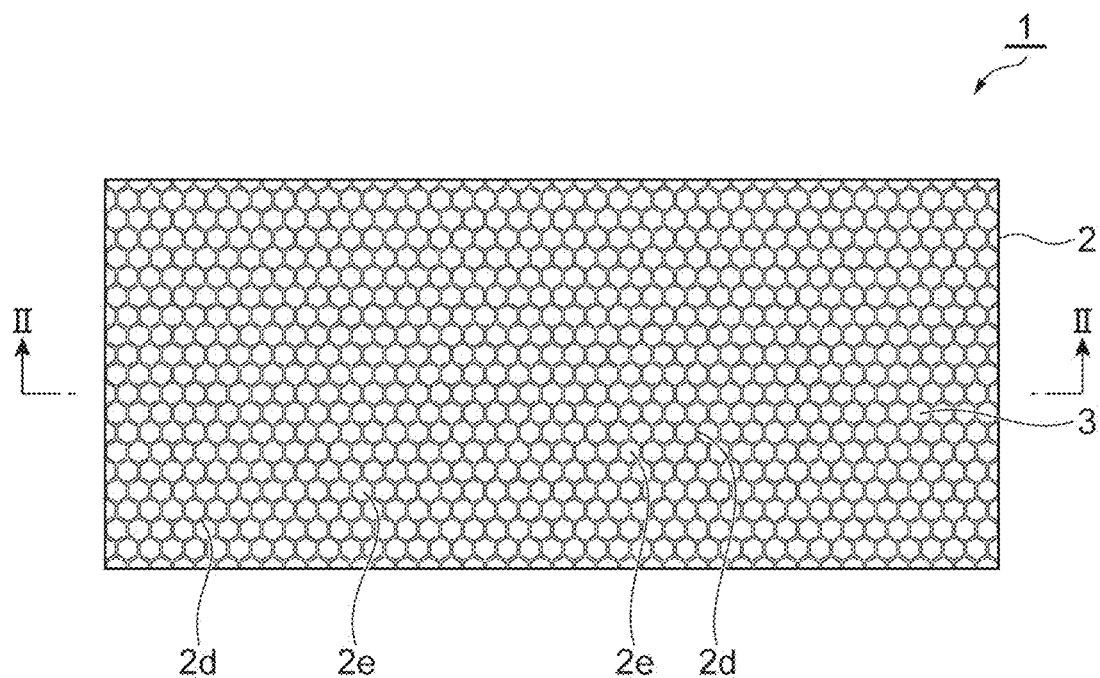
FIG. 1 is a plan view of a sample support according to one embodiment.

Hereinafter, preferred embodiments of the present disclosure will be described in detail, with reference to the drawings. Note that, in each of the drawings, the same reference numerals will be applied to the same portions or the corresponding portions, and the repeated description will be omitted. In addition, dimensions or dimensional ratios of each member (or part) illustrated in the drawings may be different from actual dimensions or dimensional ratios in order to make the description easy to understand.

[Configuration of Sample Support]

Figure 2:
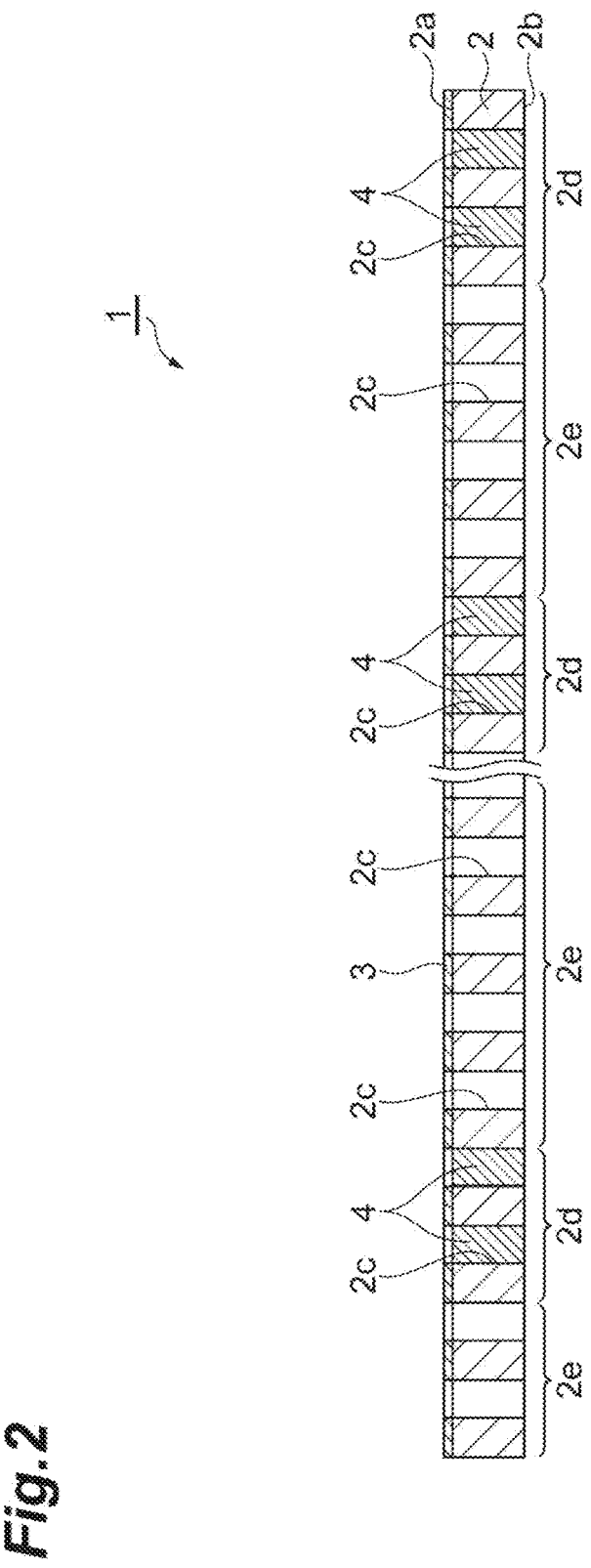
FIG. 2 is a sectional view of the sample support along line II-II illustrated in FIG. 1.

FIG. 1 is a plan view of a sample support 1 of one embodiment. As illustrated in FIG. 1 and FIG. 2, the sample support 1 includes a substrate 2, a conductive layer 3, and a reinforcement member 4. The sample support 1 is a sample support for sample ionization. The sample support 1, for example, is used for ionizing a component of a sample that is a measurement target, at the time of performing mass spectrometry.

The substrate 2 includes a first surface 2a and a second surface 2b on a side opposite to the first surface 2a. A plurality of through holes 2c are formed on the substrate 2 uniformly (with a homogeneous distribution). Each of the through holes 2c extends in a thickness direction of the sample support 1 (that is, the substrate 2) (hereinafter, simply referred to as a "thickness direction") and opens to the first surface 2a and the second surface 2b. The thickness direction is a direction perpendicular to the first surface 2a and the second surface 2b. The substrate 2, for example, is formed of an insulating material in a shape rectangular plate. The length of one side of the substrate 2 when viewed in the thickness direction, for example, is approximately several cm. The thickness of the substrate 2, for example, is approximately 1 µm to 50 µm. In this embodiment, the thickness of the substrate 2 is approximately 5 µm.

The conductive layer 3 is provided on the first surface 2a of the substrate 2. The conductive layer 3 is provided on a peripheral portion of the through hole 2c in the first surface 2a. That is, the conductive layer 3 covers a portion of the first surface 2a of the substrate 2, on which the through hole 2c is not formed. That is, the conductive layer 3 is provided not to block the through hole 2c.

The conductive layer 3 is formed of a conductivity material. Here, it is preferable that a metal having low affinity (reactivity) with respect to a sample and high conductivity is used as the material of the conductive layer 3, from the following reasons.

For example, in a case where the conductive layer 3 is formed of a metal such as copper (Cu) having high affinity with respect to a sample such as protein, in a process of ionizing the sample described below, the sample is ionized in a state where Cu atoms are attached to sample molecules, and thus, there is a concern that a detection result is shifted in a mass spectrometry method described below as the Cu atoms are attached. Therefore, it is preferable that a metal having low affinity with respect to the sample is used as the material of the conductive layer 3.

On the other hand, a metal having high conductivity easily and stably applies a constant voltage. For this reason, in a case where the conductive layer 3 is formed of the metal having high conductivity, it is possible to homogeneously apply a voltage to the first surface 2a of the substrate 2. In addition, there is a tendency that the metal having high conductivity also has high thermal conductivity. For this reason, in a case where the conductive layer 3 is formed of the metal having high conductivity, it is possible to efficiently transfer the energy of an energy ray such as laser beam that is applied to the substrate 2 to the sample via the conductive layer 3. Therefore, it is preferable that the metal having high conductivity is used as the material of the conductive layer 3.

From the viewpoint described above, for example, it is preferable that gold (Au), platinum (Pt), and the like are used as the material of the conductive layer 3. The conductive layer 3, for example, is formed to have a thickness of approximately 1 nm to 350 nm by a plating method, an atomic layer deposition (ALD) method, an evaporation method, a sputtering method, or the like. In this embodiment, the thickness of the conductive layer 3 is approximately 10 nm. Note that, for example, chromium (Cr), nickel (Ni), titanium (Ti), or the like may be used as the material of the conductive layer 3.

Figure 3:
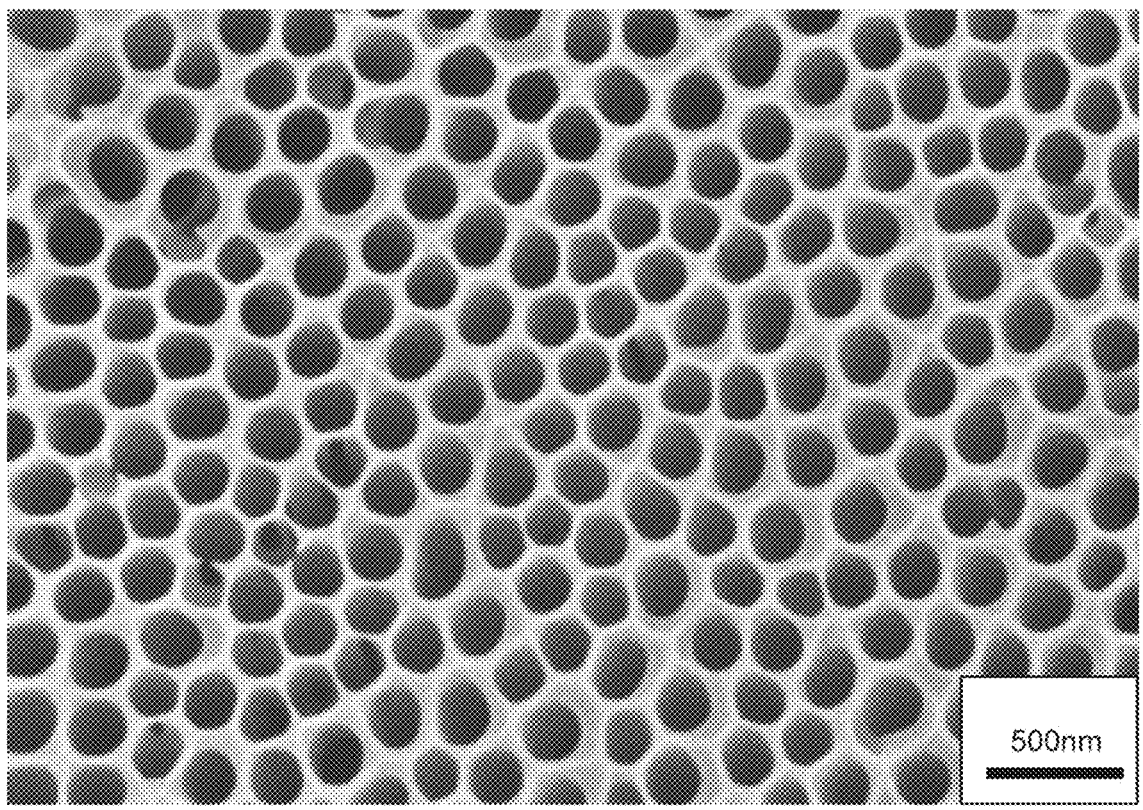
FIG. 3 is a diagram illustrating an enlarged image of a measurement region in a substrate viewed in a thickness direction of the substrate illustrated in FIG. 1.

FIG. 3 is a diagram illustrating an enlarged image of the substrate 2 when viewed in the thickness direction. In FIG. 3, a black portion is the through hole 2c, and a white portion is a partition portion between the through holes 2c. As illustrated in FIG. 3, the plurality of through holes 2c having an approximately constant width are uniformly formed on the substrate 2. The through hole 2c, for example, is approximately in a shape circle when viewed in the thickness direction. The width of the through hole 2c, for example, is approximately 1 nm to 700 nm. In this embodiment, the width of the through hole 2c is approximately 200 nm. The width of the through hole 2c indicates the diameter of the through hole 2c in a case where the through hole 2c is approximately in a shape circle when viewed in the thickness direction, and indicates the diameter (an effective diameter) of a virtual maximum cylinder falling into the through hole 2c in a case where the through hole 2c is not approximately in a shape circle. A pitch between the respective through holes 2c, for example, is approximately 1 nm to 1000 nm. In a case where the through hole 2c is approximately in a shape circle when viewed in the thickness direction, the pitch between the respective through holes 2c indicates a center-to-center distance of the respective circles, and in a case where the through hole 2c is not approximately in a shape circle, the pitch between the respective through holes 2c indicates a center axis-to-center axis distance of the virtual maximum cylinder falling into the through hole 2c. The width of the partition portion between the through holes 2c on the substrate 2, for example, is approximately 300 nm.

It is preferable that an opening rate of the through holes 2c (a ratio of all of the through holes 2c to the first surface 2a when viewed in the thickness direction) is practically 10% to 80%, and is particularly 60% to 80%. The sizes of the plurality of through holes 2c may be uneven with each other, and the plurality of through holes 2c may be partially connected to each other.

The substrate 2, for example, is an alumina porous film that is formed by performing anodic oxidation with respect to aluminum (Al). Specifically, an anodic oxidation treatment is performed with respect to an Al substrate, and a surface portion that is oxidized is peeled off from the Al substrate, and thus, the substrate 2 can be obtained. Note that, the substrate 2 may be formed by performing anodic oxidation with respect to a valve metal other than Al, such as tantalum (Ta), niobium (Nb), titanium (Ti), hafnium (Hf), zirconium (Zr), zinc (Zn), tungsten (W), bismuth (Bi), and antimony (Sb), or may be formed by performing anodic oxidation with respect to silicon (Si).

Figure 4:
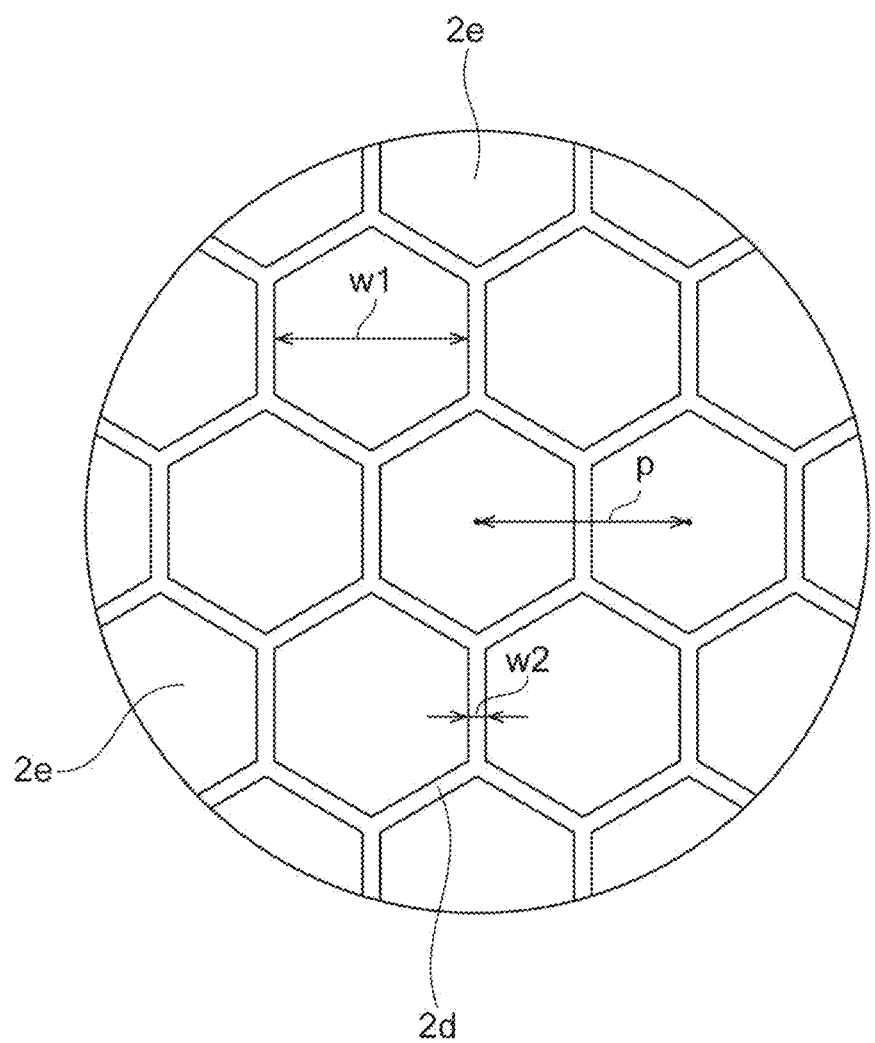
FIG. 4 is an enlarged view of the substrate viewed in the thickness direction of the substrate illustrated in FIG. 1.

FIG. 4 is an enlarged view of the sample support 1 when viewed in the thickness direction. As illustrated in FIG. 1 and FIG. 4, the substrate 2 includes a reinforcement region 2d and a measurement region 2e. The reinforcement region 2d in a shape mesh (in this embodiment, in a shape honeycomb, as an example) and a plurality of the measurement regions 2e having an approximately constant width are uniformly formed on the substrate 2. The reinforcement region 2d and the measurement region 2e respectively include a plurality of the through holes 2c (refer to FIG. 2). The plurality of measurement regions 2e when viewed in the thickness direction are surrounded by each of the reinforcement regions 2d. That is, the plurality of measurement regions 2e are separated from each other by the reinforcement region 2d. The measurement region 2e when viewed in the thickness direction, for example, is approximately in a shape hexagon.

A width w1 of the measurement region 2e, for example, is approximately 1 µm to 1000 µm. In this embodiment, the width w1 of the measurement region 2e is approximately 440 µm to 470 µm. The width w1 of the measurement region 2e indicates the diameter (an effective diameter) of a virtual maximum cylinder falling into the measurement region 2e. That is, as with the example of FIG. 4, in a case where the measurement region 2e is approximately in a shape hexagon when viewed in the thickness direction, the width w1 of the measurement region 2e indicates a distance between two facing side portions of the hexagon. A pitch p between the respective measurement regions 2e, for example, is approximately 1 µm to 1100 µm. In this embodiment, the pitch p between the measurement regions 2e is approximately 455 µm to 530 µm. The pitch p between the respective measurement regions 2e indicates a center axis-to-center axis distance of the virtual maximum cylinder falling into the measurement region 2e. A width w2 of the reinforcement region 2d, for example, is approximately 30 µm to 60 µm.

An opening rate of the measurement region 2e (a ratio of all of the measurement regions 2e to the first surface 2a when viewed in the thickness direction) is greater than or equal to 80%. The sizes of the plurality of measurement regions 2e may be uneven with each other, and the plurality of measurement regions 2e may be partially connected to each other.

The reinforcement member 4 is disposed inside a part of the plurality of through holes 2c. Specifically, the reinforcement member 4 is disposed inside the plurality of through holes 2c in the reinforcement region 2d. That is, the reinforcement member 4 is disposed inside the through hole 2c to surround each of the plurality of measurement regions 2e separated from each other when viewed in the thickness direction. The reinforcement member 4 is not disposed inside the plurality of through holes 2c in the plurality of measurement regions 2e. The reinforcement member 4 is disposed inside the plurality of through holes 2c over the first surface 2a and the second surface 2b of the substrate 2 in the reinforcement region 2d. That is, the plurality of through holes 2c in the reinforcement region 2d are filled with the reinforcement member 4. The material of the reinforcement member 4, for example, is a resin a the like. The material of the reinforcement member 4, for example, is a photoresist. In this embodiment, the material of the reinforcement member 4 is a UV cured resin, as an example.

[Manufacturing Method of Sample Support]

Next, a manufacturing method of the sample support 1 will be described. First, as illustrated in (a) of FIG. 5, the substrate 2 is provided in a printer 20. In the printer 20, a reinforcement member 41 (the UV cured resin) is provided in a region 41a having the same shape as that of the reinforcement region 2d. The substrate 2, for example, is disposed such that the first surface 2a faces the reinforcement member 41. At this time, the reinforcement region 2d of the substrate 2 and the reinforcement member 41 provided in the region 41a face each other. Subsequently, as illustrated in (b) of FIG. 5, the reinforcement member 41 is applied to the first surface 2a in the reinforcement region 2d by the printer 20. In the reinforcement region 2d, the reinforcement member 41 is disposed inside the through hole 2c from the first surface 2a.

Figure 5:
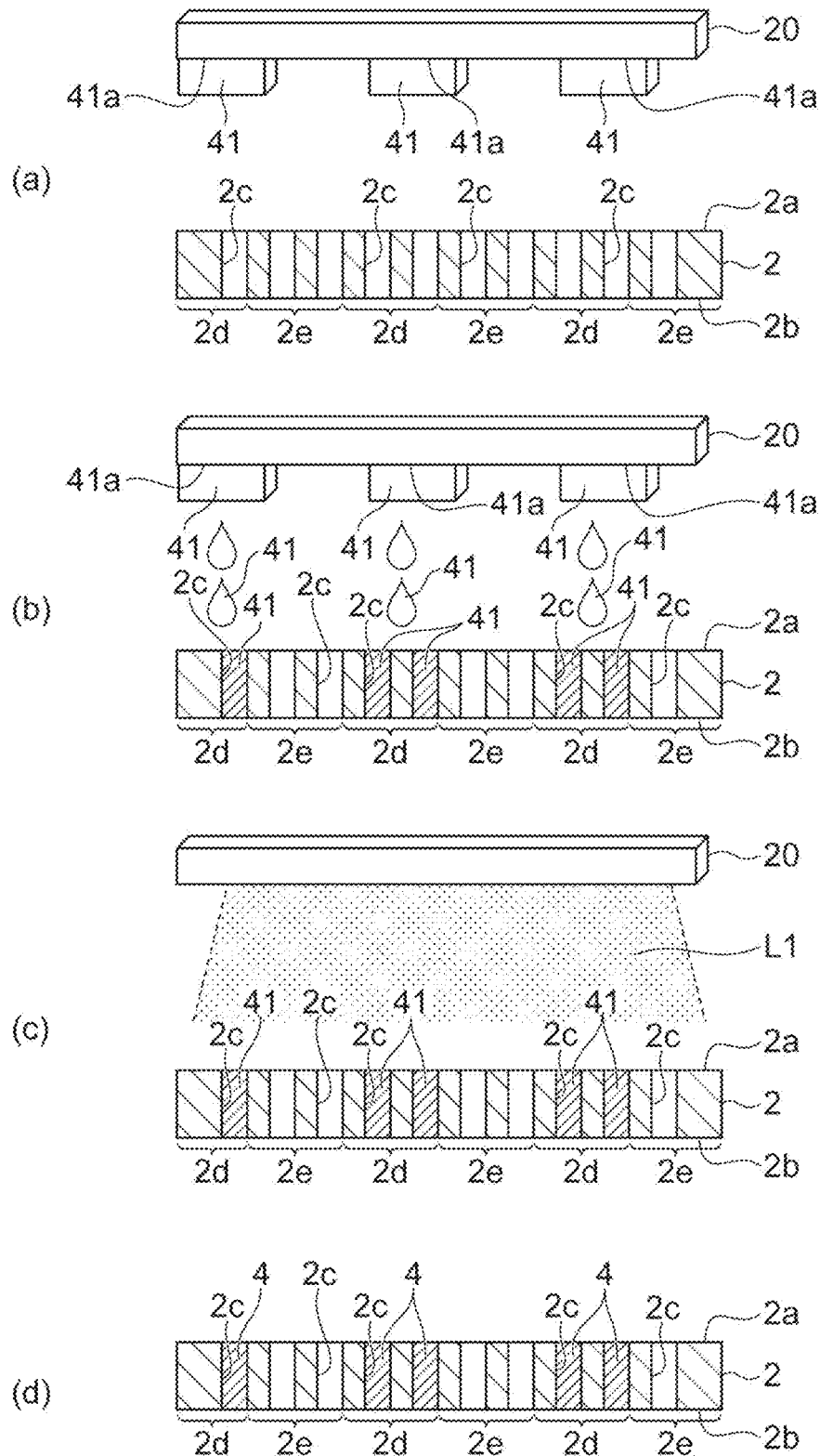
FIG. 5 is a diagram illustrating a procedure of a manufacturing method of the sample support according to one embodiment.

Subsequently, as illustrated in (c) of FIG. 5, the substrate 2 is irradiated with UV light L1. The entire first surface 2a is irradiated with the UV light L1. In a case where the substrate 2 is irradiated with the UV light L1, as illustrated in (d) of FIG. 5, the reinforcement member 41 disposed inside the through hole 2c is cured to be the reinforcement member 4. Subsequently, the conductive layer 3 is provided on the first surface 2a. As described above, the sample support 1 can be obtained.

[Sample Ionization Method]

Next, a sample ionization method using the sample support 1 will be described with reference to FIG. 6 and FIG. 7. Here, as an example, a laser desorption/ionization method (a part of a mass spectrometry method of a mass spectrometry device 10) using laser beam (an energy ray) will be described. In FIG. 7, the through hole 2c, the conductive layer 3, and the reinforcement member 4 in the sample support 1 are not illustrated.

Figure 6:
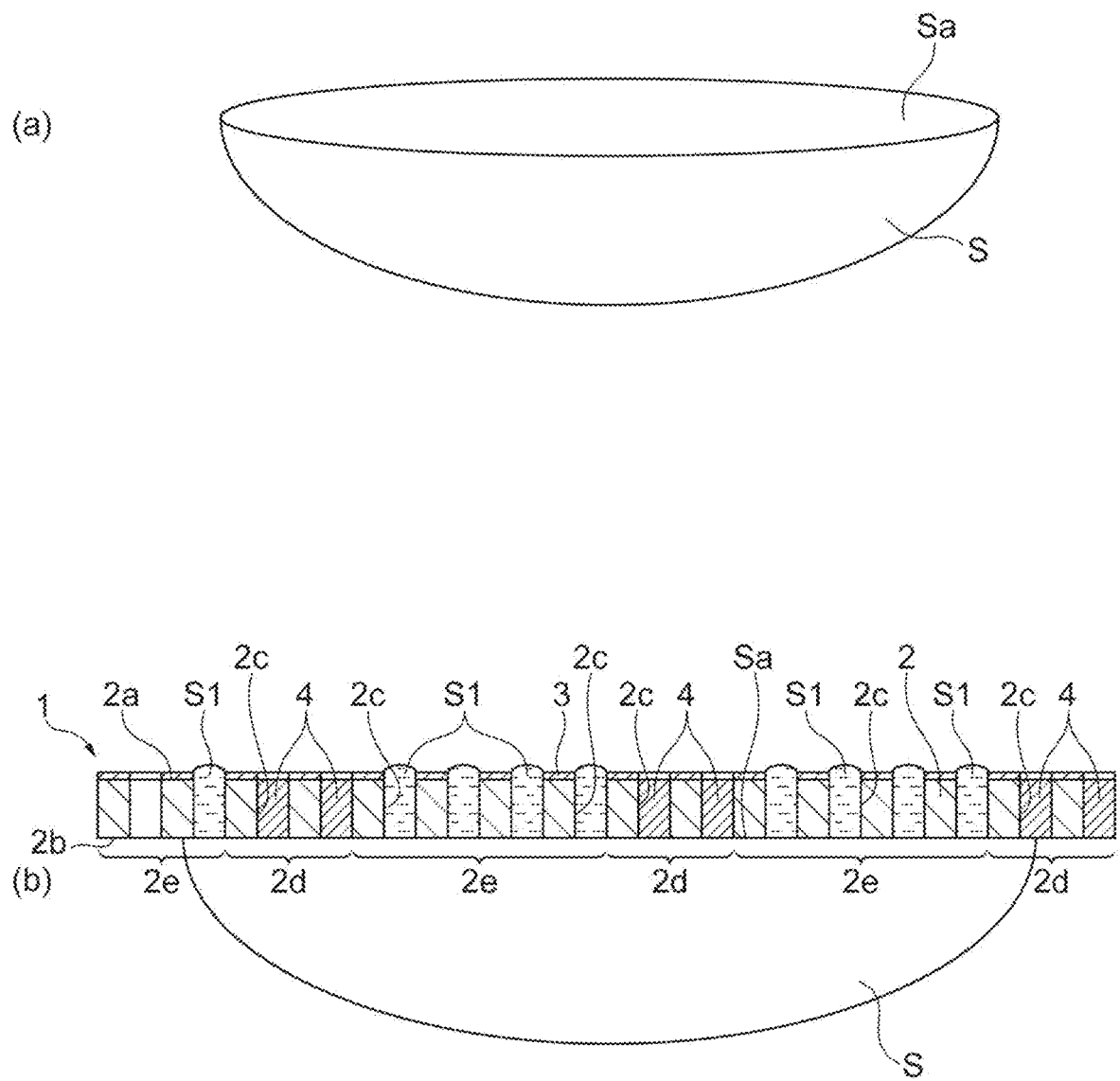
FIG. 6 is a diagram illustrating a procedure of a mass spectrometry method according to one embodiment.
Figure 7:
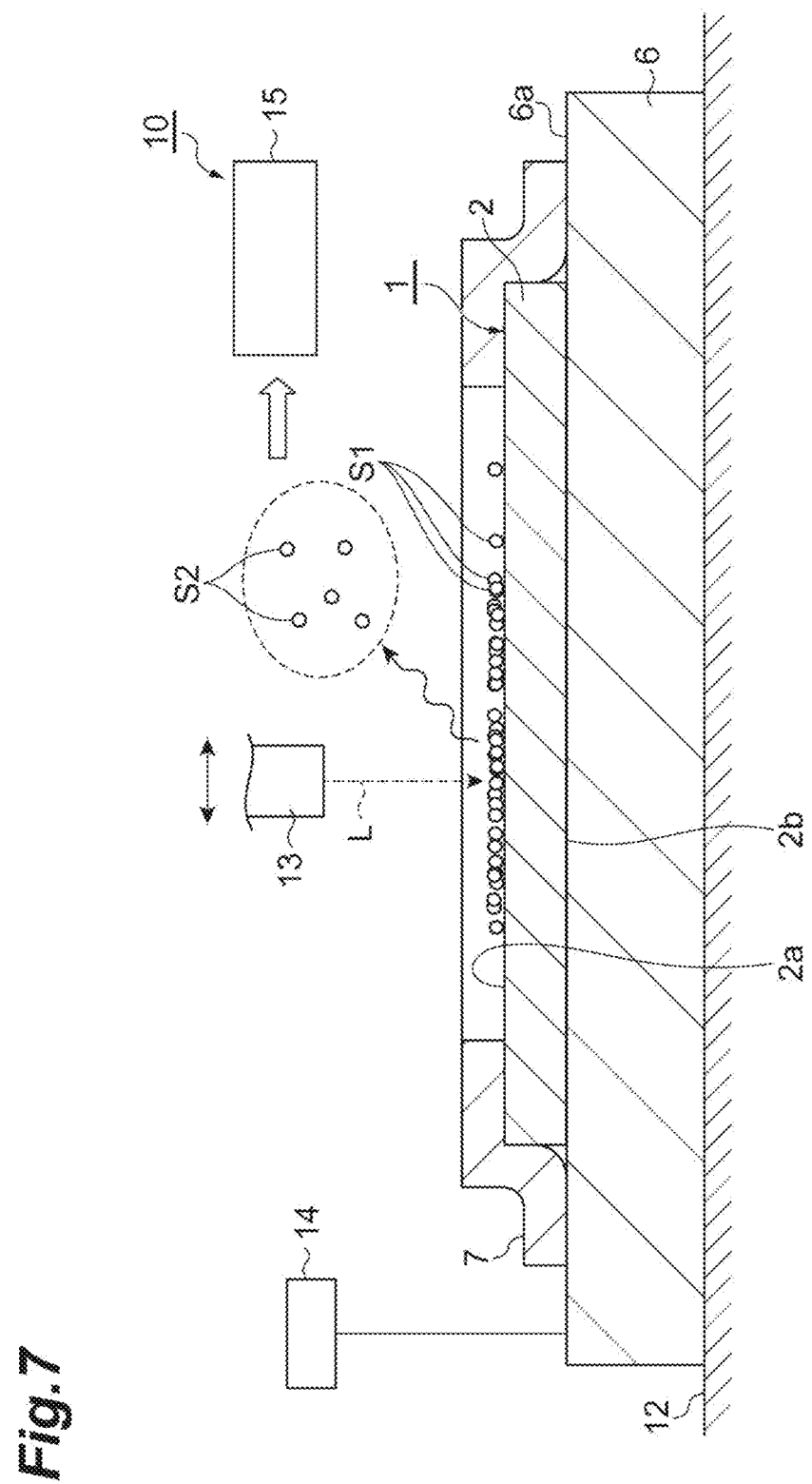
FIG. 7 is a diagram illustrating the procedure of the mass spectrometry method according to one embodiment.

First, as illustrated in (a) of FIG. 6, a sample S and the sample support 1 described above are prepared (a first step). The sample S is cut, and a sectional surface Sa thereof is exposed. Here, the sample S, for example, is a biological sample (a hydrous sample). The sample S, for example, is a fruit such as a strawberry. In order to smoothly move a component S1 of the sample S (refer to (b) of FIG. 6), a solution for decreasing the viscosity of the component S1 (for example, an acetonitrile mixed liquid, acetone, or the like) may be added to the sample S. The sample support 1 may be prepared by being manufactured by a person who carries out the ionization method and the mass spectrometry method, or may be prepared by being acquired from a manufacturer, a seller, or the like of the sample support 1.

Subsequently, as illustrated in (b) of FIG. 6, the sample support 1 is disposed on the sample S such that the second surface 2b faces the sectional surface Sa of the sample S (a second step). The sample support 1 is disposed on the sample S such that the second surface 2b is in contact with the sectional surface Sa. The component S1 of the sample S is moved toward the first surface 2a side of the substrate 2 from the second surface 2b side of the substrate 2 through the through hole 2c, by a capillary action. Specifically, the component S1 of the sample S is moved toward the first surface 2a side from the second surface 2b side through the through hole 2c, in the measurement region 2e. More specifically, the component S1 of the sample S is moved to the first surface 2a side through the through hole 2c in which the reinforcement member 4 is not disposed among the plurality of through holes 2c. The component S1 that is moved to the first surface 2a side of the substrate 2 is remained on the first surface 2a side by a surface tension. Subsequently, the sample support 1 is peeled off from the sample S (a third step). The sample support 1 is peeled off from the sample S before the component S1 attached to the substrate 2 is dried.

Subsequently, as illustrated in FIG. 7, the sample support 1 is mounted on a mounting surface 6a of a glass slide (a mounting portion) 6. The glass slide 6 is a glass substrate on which a transparent conductive film such as an indium tin oxide (ITO) film is formed, and the surface of the transparent conductive film is the mounting surface 6a. Note that, not only the glass slide 6 but also a member that is capable of ensuring conductivity (for example, a substrate formed of a metal material such as stainless steel, or the like) can be used as the mounting portion.

Subsequently, the sample support 1 is fixed to the glass slide 6. The sample support 1 is fixed to the glass slide 6 by a tape 7 having conductivity (for example, a carbon tape or the like). The tape 7 may be a part of the sample support 1, or may be prepared separately from the sample support 1. In a case where the tape 7 is a part of the sample support 1 (that is, in a case where the sample support 1 includes the tape 7), for example, the tape 7 may be fixed in advance to the first surface 2a side in a peripheral portion of the substrate 2. More specifically, the tape 7 may be fixed onto the conductive layer 3 in the peripheral portion of the substrate 2.

Subsequently, in a state where the glass slide 6 and the sample support 1 are fixed to each other, the glass slide 6 and the sample support 1 are mounted on a support portion 12 (for example, a stage) of the mass spectrometry device 10. Subsequently, in a state where the component S1 of the sample S that is attached to the sample support 1 is dried, a voltage is applied to the conductive layer 3 of the sample support 1 (refer to FIG. 2) via the mounting surface 6a of the glass slide 6 and the tape 7 by a voltage application unit 14 of the mass spectrometry device 10 (a fourth step). Subsequently, the first surface 2a of the substrate 2 is irradiated with laser beam L by a laser beam irradiation unit 13 of the mass spectrometry device 10 (a fourth step). Here, the laser beam irradiation unit 13 scans the first surface 2a with the laser beam L. The scanning of the laser beam L with respect to the first surface 2a can be performed by operating at least one of the support portion 12 and the laser beam irradiation unit 13. In addition, the width of the measurement region 2e is larger than a spot diameter of the laser beam L.

As described above, the first surface 2a of the substrate 2 is irradiated with the laser beam L while a voltage is applied to the conductive layer 3, and thus, the component S1 that is moved to the first surface 2a side of the substrate 2 is ionized, and a sample ion S2 (the component S1 that is ionized) is emitted. Specifically, energy is transmitted from the conductive layer 3 absorbing the energy of the laser beam L to the component S1 that is moved to the first surface 2a side of the substrate 2, and the component S1 obtaining the energy is gasified and obtains a charge, and thus, the sample ion S2 is obtained. Each of the steps described above corresponds to the ionization method of the sample S, using the sample support 1 (here, as an example, a laser desorption/ionization method as a part of the mass spectrometry method).

The sample ion S2 that is emitted is moved toward a ground electrode (not illustrated) that is provided between the sample support 1 and an ion detection unit 15 while being accelerated. That is, the sample ion S2 is moved toward the ground electrode while being accelerated by a potential difference that occurs between the conductive layer 3 to which a voltage is applied and the ground electrode. Then, the sample ion S2 is detected by the ion detection unit 15 of the mass spectrometry device 10 (a fifth step). Here, the ion detection unit 15 detects the sample ion S2 to correspond to a scanning position of the laser beam L. Accordingly, it is possible to image a two-dimensional distribution of molecules configuring the sample S. Note that, here, the mass spectrometry device 10 is a mass spectrometry device using a time-of-flight mass spectrometry (TOF-MS) method. Each of the steps described above corresponds to the mass spectrometry method using the sample support 1.

As described above, in the sample support 1, the plurality of through holes 2c opening to the first surface 2a and the second surface 2b on a side opposite to the first surface 2a are formed on the substrate 2. For this reason, for example, the sample support 1 is disposed on the sample S such as a biological sample such that the second surface 2b of the substrate 2 faces the sample S, it is possible to move the component S1 of the sample S toward the first surface 2a side from the second surface 2b side through the through hole 2c, by using a capillary action. Further, in a case where the first surface 2a is irradiated with the laser beam L, the energy is transmitted to the component of the sample that is moved to the first surface 2a side via the conductive layer 3, and thus, it is possible to ionize the component S1 of the sample S. In addition, the reinforcement member 4 is disposed inside a part of the plurality of through holes 2c. For this reason, the substrate 2 is reinforced by the reinforcement member 4. Accordingly, the substrate 2 is less likely to be bent. Accordingly, according to the sample support 1, it is possible to suitably ensure the strength of the substrate 2 and to suppress the breakage of the substrate 2.

For example, when the sample support 1 is carried or when the sample support 1 is disposed on the sample S, the bending of the substrate 2 is reduced. Accordingly, the breakage of the substrate 2 is suppressed. In addition, for example, when the sample support 1 is disposed on the sample (for example, the sectional surface of a cut strawberry) S having a pressure-sensitive adhesive force, and then, is peeled off, the breakage of the substrate 2 due to the pressure-sensitive adhesive force is suppressed.

For example, a surface-assisted laser desorption/ionization (SALDI) method as a method for ionizing the sample is known (for example, refer to Japanese Patent No. 5129628). SALDI is a method for ionizing the sample by dropping the sample onto a substrate having a fine concave-convex structure on a surface and by irradiating the substrate with the laser beam. A plurality of concave portions formed on the substrate that is used in SALDI do not penetrate through the substrate. For this reason, in a case where the strength of the substrate is insufficient, it is possible to easily improve the strength of the substrate by making a portion of the substrate on a side opposite to the concave portion (a portion in which the concave portion is not formed) thick.

In contrast, the sample support 1 moves the component of the sample toward the first surface 2a side from the second surface 2b side through the through hole 2c, by using a capillary action. Accordingly, in order to suitably attain the capillary action, it may be difficult to increase the thickness of the substrate 2. In such a case, the reinforcement of the substrate 2 by the reinforcement member 4 is particularly effective.

The width of the through hole 2c is 1 nm to 700 nm, and the thickness of the substrate 2 is 1 μm to 50 μm. Accordingly, it is possible to suitably attain the movement of the component S1 of the sample S by the capillary action described above.

The material of the reinforcement member 4 is a resin. Accordingly, it is possible to easily form the reinforcement member 4.

The substrate 2 includes the reinforcement region 2d including the plurality of through holes 2c, and the measurement region 2e including the plurality of through holes 2c. The reinforcement member 4 is disposed inside the plurality of through holes 2c in the reinforcement region 2d, and the reinforcement member 4 is not disposed inside the plurality of through holes 2c in the measurement region 2e. The reinforcement member 4 is disposed inside the plurality of through holes 2c in the reinforcement region 2d, and thus, the substrate 2 is less likely to be bent. Accordingly, it is possible to further ensure the strength of the substrate 2 and to further suppress the breakage of the substrate 2.

In addition, in the ionization method of the sample S described above, the plurality of through holes 2c opening to the first surface 2a and the second surface 2b on a side opposite to the first surface 2a are formed on the substrate 2. In a case where the sample support 1 is disposed on the sample S such that the second surface 2b of the substrate 2 faces the sample S, the component S1 of the sample S is moved toward first surface 2a side from the second surface 2b side through the through hole 2c, by a capillary action. Further, in a case where the sample support 1 is peeled off from the sample S, and then, the first surface 2a is irradiated with the laser beam L while a voltage is applied to the conductive layer 3, the energy is transmitted to the component S1 of the sample S that is moved to the first surface 2a side. Accordingly, the component S1 of the sample S is ionized. In addition, in such a sample ionization method, the reinforcement member 4 is disposed inside a part of the plurality of through holes 2c. For this reason, the substrate 2 is reinforced by the reinforcement member 4. Accordingly, the substrate 2 is less likely to be bent, and thus, in the third step, the breakage of the substrate 2 when the sample support 1 is peeled off from the sample S is suppressed. Accordingly, according to such a sample ionization method, it is possible to ionize the component S1 of the sample S while suppressing the breakage of the substrate 2, by using the substrate 2 of which the strength is suitably ensured.

In the third step, the sample support 1 is peeled off from the sample S before the component S1 attached to the substrate 2 is dried. Accordingly, it is possible to more smoothly peel off the sample support 1 from the sample S before the sample support 1 and the sample S are firmly fixed.

As described above, according to the mass spectrometry method described above, it is possible to perform the mass spectrometry of the sample S while suppressing the breakage of the substrate 2, by using the substrate 2 of which the strength is suitably ensured.

Modification Example

As described above, the embodiment of the present disclosure have been described, but the present disclosure is not limited to the embodiment described above, and the present disclosure can be variously modified within a range not departing from the gist thereof.

An example has been described in which the through hole 2c is filled with the reinforcement member 4, but the through hole 2c may not be filled with the reinforcement member 4. The reinforcement member 4, for example, may extend to the middle of the through hole 2c from the first surface 2a of the substrate 2. That is, the reinforcement member 4 may be disposed only in a part of the inside of the through hole 2c.

The conductive layer 3 may not be provided on an inner surface of the through hole 2c as described above in the embodiment, or may be provided on the inner surface of the through hole 2c.

The substrate 2 may have conductivity, and in the mass spectrometry method, the first surface 2a may be irradiated with the laser beam L while a voltage is applied to the substrate 2. In a case where the substrate 2 has conductivity, it is possible to omit the conductive layer 3 in the sample support 1 and to obtain the same effects as those in the case of using the sample support 1 including the conductive layer 3 described above. Note that, irradiating the first surface 2a of the substrate 2 with the laser beam L indicates that the conductive layer 3 is irradiated with the laser beam L in a case where the sample support 1 includes the conductive layer 3, and indicates that the first surface 2a of the substrate 2 is irradiated with the laser beam L in a case where the substrate 2 has conductivity.

An example has been described in which the material of the reinforcement member 4 is a UV cured resin, but the material of the reinforcement member 4 may be a thermosetting resin. In addition, the material of the reinforcement member 4 may be a metal. The metal, for example, is nickel (Ni) or the like. In a case where the material of the reinforcement member 4 is a metal, the generation of organic gas is suppressed when the component S1 of the sample S is ionized, and thus, a noise in a detection result of the ionized sample ion S2 is reduced. In addition, as described above, the reinforcement member 4 can be various materials, and thus, it is possible to suitably provide the reinforcement member 4 only in the inside of a part of the through holes 2c by a processing method according to each material. Note that, in a case where the material of the reinforcement member 4 is the thermosetting resin, in the manufacturing method of the sample support 1 described above, heat may be applied to the substrate 2 instead of irradiating the substrate 2 with the UV light L1.

Figure 8:
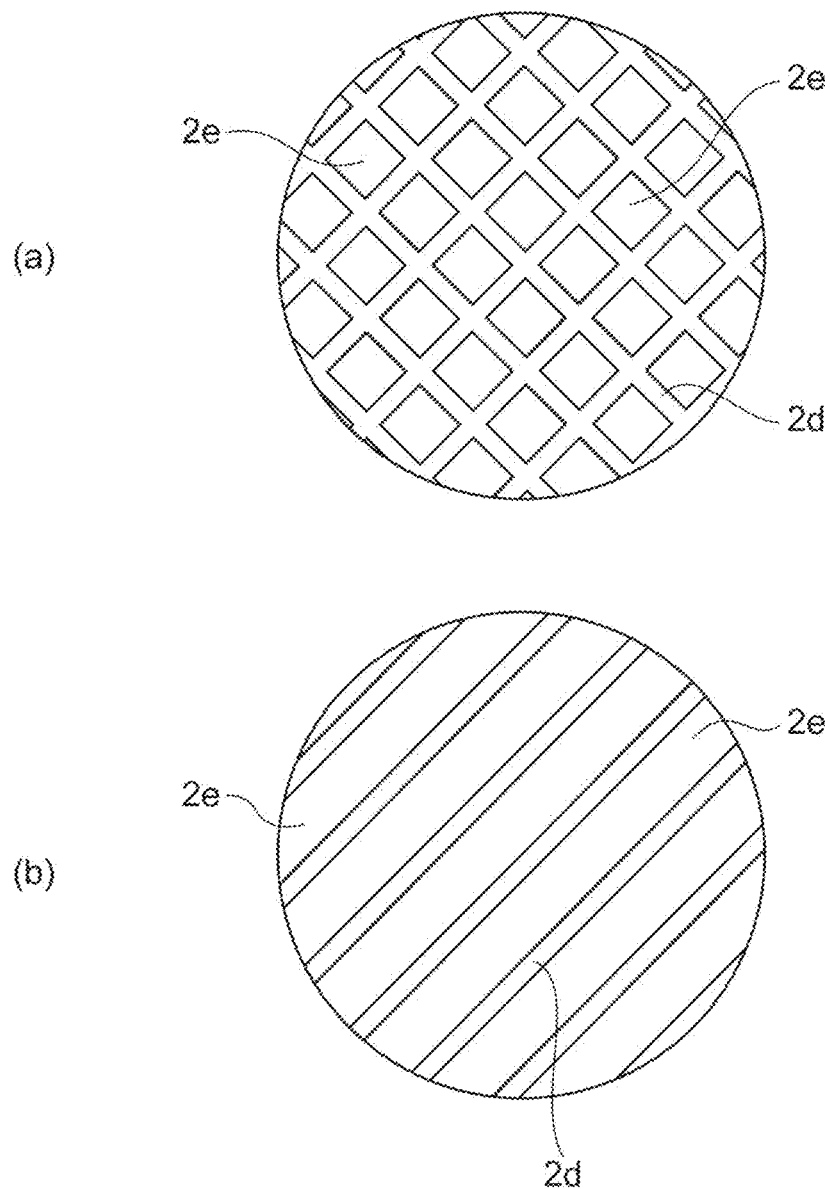
FIG. 8 is a diagram illustrating a sample support according to a modification example.

An example has been described in which the measurement region 2e when viewed in the thickness direction is approximately in a shape hexagon, but the measurement region 2e may have various shapes. For example, as illustrated in (a) of FIG. 8, the measurement region 2e when viewed in the thickness direction may be approximately in a shape quadrangle. That is, the reinforcement region 2d may be provided in a shape grid. In addition, as illustrated in (b) of FIG. 8, the measurement region 2e when viewed in the thickness direction may be approximately in a shape rectangle extending in one direction. That is, the reinforcement region 2d may be formed by a plurality of regions that are disposed at approximately regular intervals and are parallel to each other. In addition, the measurement region 2e when viewed in the thickness direction may have a shape other than the shapes described above, and for example, may be approximately in a shape circle, or may be approximately in a shape triangle.

Figure 9:
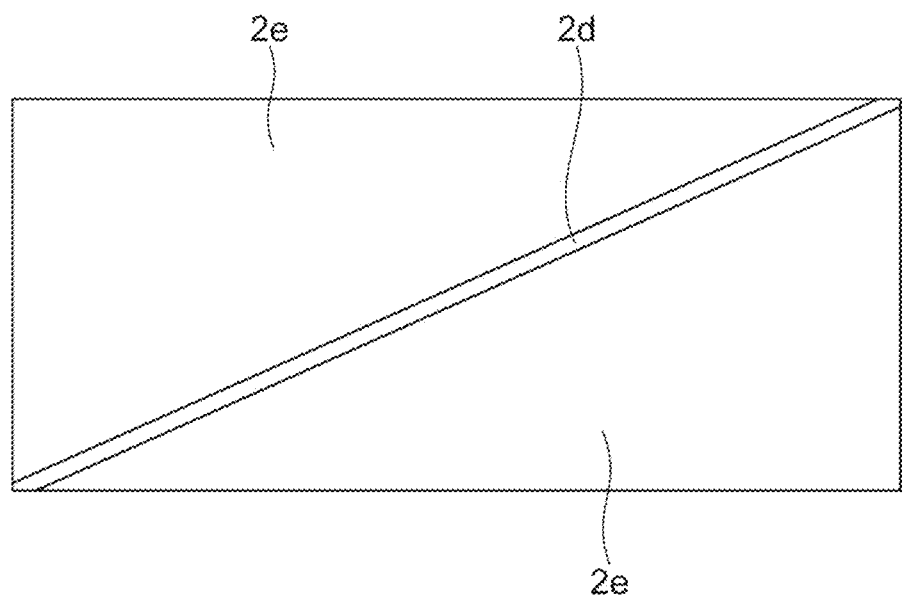
FIG. 9 is a diagram illustrating a sample support according to a modification example.

In addition, an example has been described in which the reinforcement region 2d is in a shape mesh, but the reinforcement region 2d may have various shapes insofar as the reinforcement region 2d includes the plurality of through holes 2c in which the reinforcement member 4 is disposed. The reinforcement region 2d may include a region continuous from one end of the substrate 2 to the other end opposite to the one end when viewed in the thickness direction. Specifically, the reinforcement region 2d, as illustrated in FIG. 9, for example, may be an elongated region extending along a diagonal line of the substrate 2. Here, the one end and the other end of the substrate 2 are respectively corner portions facing each other on the diagonal line of the substrate 2. In this case, The substrate 2 is less likely to be bent. Accordingly, it is possible to more reliably ensure the strength of the substrate 2 and to more reliably suppress the breakage of the substrate 2. Note that, the one end and the other end of the substrate 2 may be respectively side portions of the substrate 2, facing each other. That is, the reinforcement region 2d may be an elongated region extending along a direction orthogonal to the side portion of the substrate 2 described above but not the diagonal line of the substrate 2.

Figure 10:
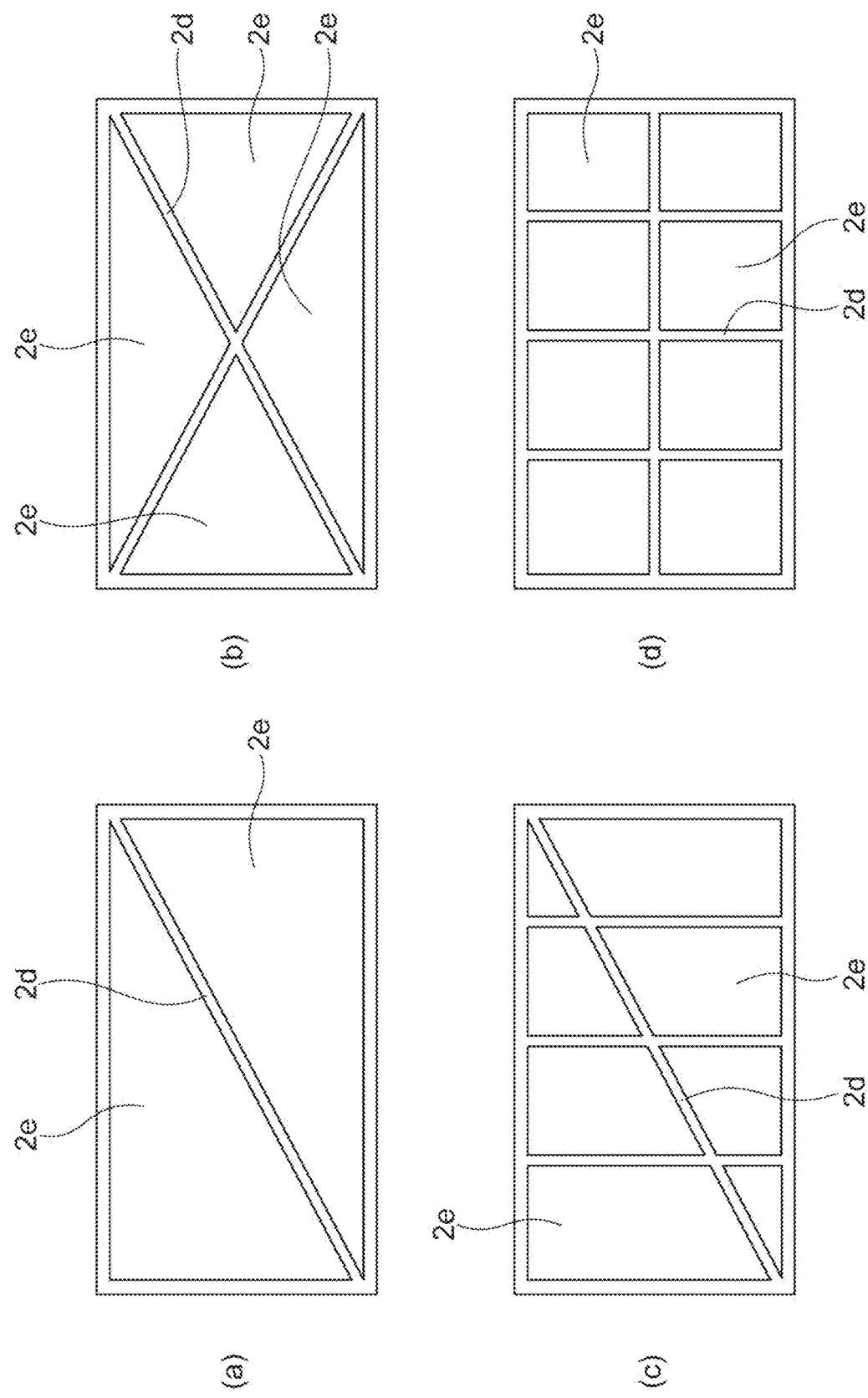
FIG. 10 is a diagram illustrating a sample support according to a modification example.

In addition, an example has been described in which the width of the measurement region 2e is approximately 1 µm to 1000 µm, and the pitch between the respective measurement regions 2e is approximately 1 µm to 1100 µm, but the width of the measurement region 2e and the pitch between the respective measurement regions 2e may be approximately several mm to several cm. Specifically, the reinforcement region 2d may include one or a plurality of elongated regions. That is, as illustrated in (a) of FIG. 10, the reinforcement region 2d, for example, may include an annular region extending along the outer edge of the substrate 2 and one region extending along the diagonal line of the substrate 2. In this case, two measurement regions 2e are formed on the substrate 2. In addition, as illustrated in (b) of FIG. 10, the reinforcement region 2d, for example, may include the annular region extending along the outer edge of the substrate 2 and two regions extending along two diagonal lines of the substrate 2. In this case, four measurement regions 2e are formed on the substrate 2. In addition, as illustrated in (c) of FIG. 10, the reinforcement region 2d may include the annular region extending along the outer edge of the substrate 2, one region extending along one diagonal line of the substrate 2, and a plurality of (here, three) regions extending along one side portion of the substrate 2. In this case, eight measurement regions 2e are formed on the substrate 2. In addition, as illustrated in (d) of FIG. 10, the reinforcement region 2d may include the annular region extending along the outer edge of the substrate 2, a plurality of (here, three) regions extending along one side portion of the substrate 2, and one region extending along the other side portion intersecting with the one side portion of the substrate 2 described above. In this case, eight measurement regions 2e are formed on the substrate 2.

In such a case, it is possible to dispose a plurality of samples S corresponding to a plurality of the measurement regions 2e. Then, in each of the plurality of measurement regions 2e, it is possible to perform each of the ionization and the mass spectrometry of the components S1 of the plurality of samples S. In addition, it is possible to perform the ionization and the mass spectrometry of the plurality of samples S at one time.

The sample support 1 may include a frame. In this case, the frame is provided on the first surface 2a of the substrate 2. Specifically, the frame is fixed to the peripheral portion of the substrate 2. The frame is fixed to the first surface 2a of the substrate 2 by an adhesive layer. The frame has approximately the same outer shape as that of the substrate 2 when viewed in the thickness direction. An opening is formed in the frame. A portion corresponding to the opening in the substrate 2 functions as an effective region for moving the component S1 of the sample S to the first surface 2a side. In this case, the conductive layer 3 may be continuously (integrally) formed in a region corresponding to the opening of the frame in the first surface 2a of the substrate 2 (that is, a region corresponding to the effective region), the inner surface of the opening, and a surface of the frame on a side opposite to the substrate 2. By providing such a frame, it is possible to improve the strength of the sample support 1 (the substrate 2) and to improve the handleability of the sample support 1. In addition, it is possible to suppress the deformation of the substrate 2 due to a temperature change or the like.

In the mass spectrometry device 10, the laser beam irradiation unit 13 may collectively apply the laser beam L to the first surface 2a of the substrate 2, and the ion detection unit 15 may detect the sample ion S2 while maintaining two-dimensional information of the region. That is, the mass spectrometry device 10 may be a projection mass spectrometry device.

An example has been described in which the sample support 1 is mounted on the glass slide 6, but the sample support 1 may be mounted in the support portion 12 of the directly mass spectrometry device 10.

The application of the sample support 1 is not limited to the ionization of the sample S by the irradiation of the laser beam L. The sample support 1 may be used in the ionization of the sample S by the irradiation of energy rays other than the laser beam L (for example, an ion beam, an electron beam, and the like).

The sample support 1 may be fixed to the glass slide 6 by means other than the tape 7 (for example, means using an adhesive agent, a fixing tool, or the like). In addition, a voltage may be applied to the conductive layer 3 without using the mounting surface 6a of the glass slide 6 and the tape 7. In this case, the glass slide 6 and the tape 7 may not have conductivity.

The sample ionization method described above can be used not only in the mass spectrometry of the molecules configuring the sample S, but also in other measurements and tests such as ion mobility measurement.

The sample S may be a dry sample. In this case, in order to move the component S1 of the sample S to the first surface 2a side of the substrate 2 by a capillary action, for example, a solvent (for example, an acetonitrile mixed liquid, acetone, or the like) may be added to the sample S.

Next, a case where the material of the reinforcement member 4 is a negative photoresist will be described as a first modification example of the manufacturing method of the sample support. First, as illustrated in (a) of FIG. 11, the substrate 2 is provided in the printer 20. The reinforcement member 41 (the negative photoresist) is provided in the printer 20. The substrate 2, for example, is disposed such that the first surface 2a faces the reinforcement member 41. Subsequently, as illustrated in (b) of FIG. 11, the reinforcement member 41 is applied to the first surface 2a by the printer 20. The reinforcement member 41 is disposed inside the through hole 2c from the first surface 2a. Subsequently, the substrate 2 on which the reinforcement member 41 is disposed is heated, and thus, the reinforcement member 41 is solidified.

Figure 11:
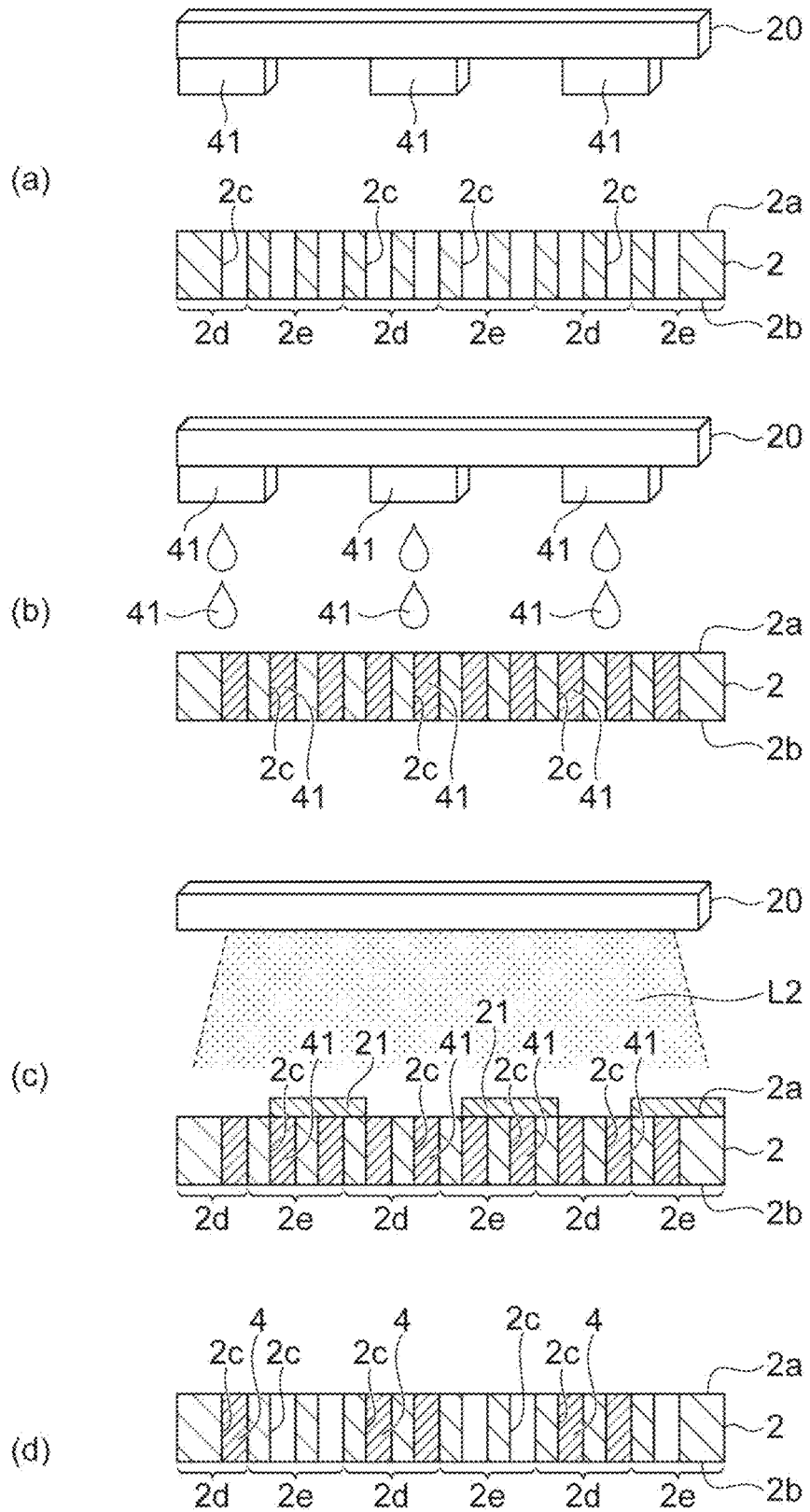
FIG. 11 is a diagram illustrating a procedure of a manufacturing method of a sample support according to a first modification example.

Subsequently, as illustrated in (c) of FIG. 11, a mask 21 is provided on the first surface 2a of the substrate 2. The mask 21 is provided on the first surface 2a in the measurement region 2e. Subsequently, the substrate 2 is irradiated with UV light L2, and thus, the reinforcement member 41 disposed inside the through hole 2c in the reinforcement region 2d is exposed. The UV light L2 is applied to the entire surface of the substrate 2 on a side opposite to the second surface 2b. The mask 21 is provided on the first surface 2a in the measurement region 2e, and thus, the reinforcement member 41 disposed inside the through hole 2c in the measurement region 2e is not exposed. Subsequently, as illustrated in (d) of FIG. 11, the mask 21 is removed from the first surface 2a. Subsequently, the substrate 2 on which the reinforcement member 41 is disposed is dipped in a developer, and thus, the reinforcement member 41 disposed inside the through hole 2c in the measurement region 2e is removed. On the other hand, the solubility of the reinforcement member 41 with respect to the developer decreases by being exposed, and thus, the reinforcement member 41 disposed in the reinforcement region 2d remains without being removed. The reinforcement member 41 that remains as described above is the reinforcement member 4. Subsequently, the conductive layer 3 is provided on the first surface 2a. As described above, the sample support 1 is obtained.

Next, a case where the material of the reinforcement member 4 (the reinforcement member 41) is a metal (for example, Ni) will be described as a second modification example of the manufacturing method of the sample support. First, as illustrated in (a) of FIG. 12, the substrate 2 is prepared. Subsequently, as illustrated in (b) of FIG. 12, a mask 22 is provided on the first surface 2a of the substrate 2. The mask 22 is provided on the first surface 2a in the measurement region 2e. Subsequently, a metal film is formed by the evaporation of the reinforcement member 41 (Ni). The metal film including the reinforcement member 41 is formed on the first surface 2a in the reinforcement region 2d.

Figure 12:
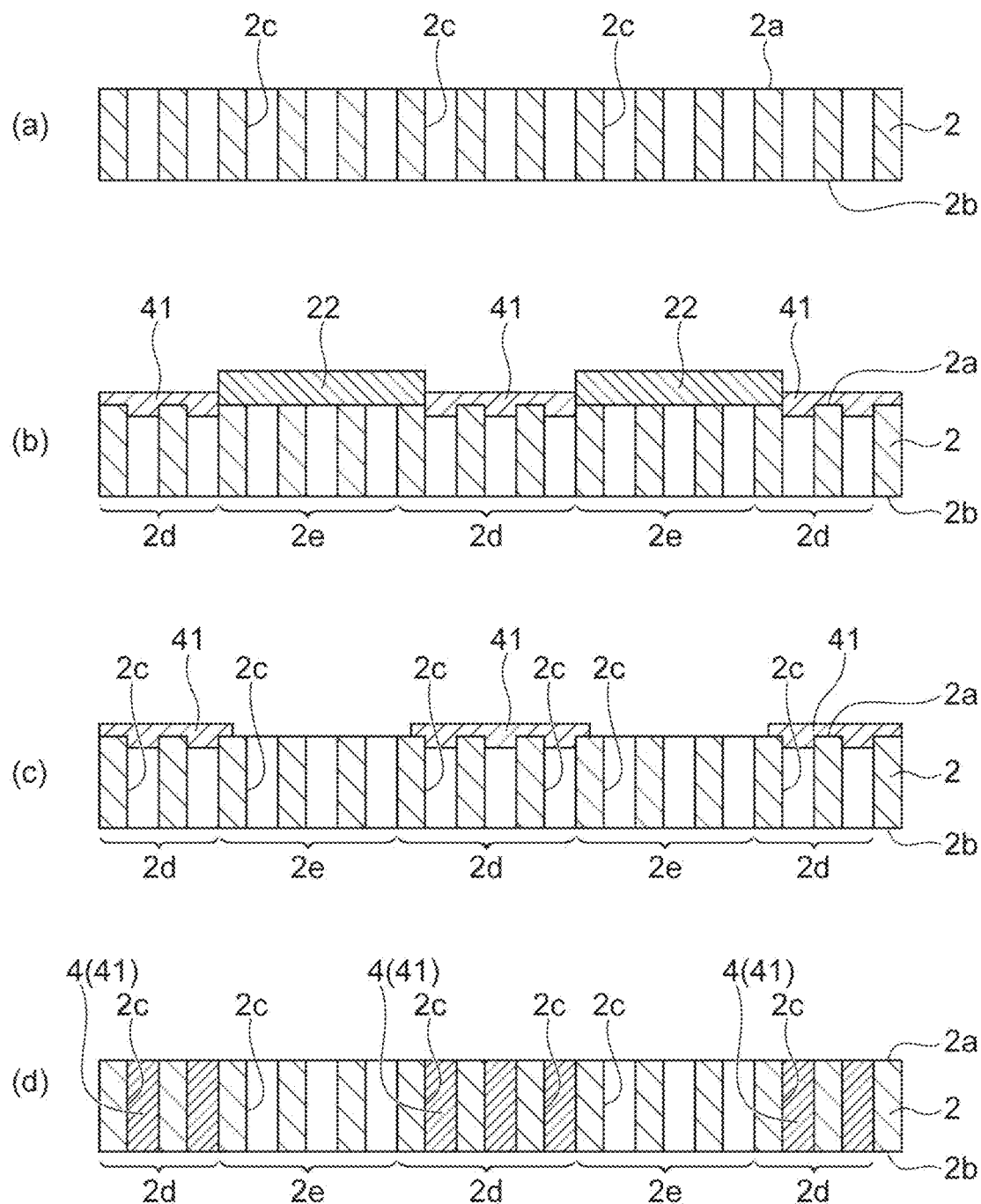
FIG. 12 is a diagram illustrating a procedure of a manufacturing method of a sample support according to a second modification example.

Subsequently, as illustrated in (c) of FIG. 12, the mask 22 is removed from the first surface 2a. Subsequently, as illustrated in (d) of FIG. 12, the reinforcement member 41 is disposed in the through hole 2c by electrolytic plating. Specifically, first, the substrate 2 on which the metal film including the reinforcement member 41 is formed is dipped in an electrolytic solution. Subsequently, a current is supplied to the reinforcement member 41. When a current is supplied in a state where the reinforcement member 41 is dipped in the electrolytic solution, metal atoms of the reinforcement member 41 are dissolved in the electrolytic solution. Then, the inner surface of the through hole 2c is plated with the dissolved of the metal atoms of the reinforcement member 41 inside the through hole 2c in the reinforcement region 2d. The metal atoms of the reinforcement member 41 disposed inside the through hole 2c function as the reinforcement member 4. Subsequently, the conductive layer 3 is provided on the first surface 2a. As described above, the sample support 1 is obtained.

REFERENCE SIGNS LIST

1: sample support, 2: substrate, 2a: first surface, 2b: second surface, 2c: through hole, 2d: reinforcement region, 2e: measurement region, 3: conductive layer, 4: reinforcement member, L: laser beam (energy ray), S: sample, S1: component, S2: sample ion.

The invention claimed is:

1. A sample ionization method, comprising:
a first step of preparing a sample and a sample support including a substrate formed with a plurality of through holes opening to a first surface and a second surface on a side opposite to the first surface, a conductive layer provided not to block the through hole in the first surface, and a reinforcement member disposed inside a part of the plurality of through holes;
a second step of disposing the sample support on the sample such that the second surface faces the sample;
a third step of peeling off the sample support from the sample; and
a fourth step of ionizing a component of the sample moved to the first surface side through a through hole in which the reinforcement member is not disposed among the plurality of through holes, by irradiating the first surface with an energy ray while applying a voltage to the conductive layer.

2. The sample ionization method according to claim 1, wherein in the third step, the sample support is peeled off from the sample before the component attached to the substrate is dried.

3. A mass spectrometry method, comprising:
each of the steps of the sample ionization method according to claim 1; and
a fifth step of detecting the component ionized in the fourth step.

4. A sample ionization method, comprising:
a first step of preparing a sample and a sample support including a substrate having conductivity and formed with a plurality of through holes opening to a first surface and a second surface on a side opposite to the first surface, and a reinforcement member disposed inside a part of the plurality of through holes;
a second step of disposing the sample support on the sample such that the second surface faces the sample;
a third step of peeling off the sample support from the sample; and
a fourth step of ionizing a component of the sample moved to the first surface side through a through hole in which the reinforcement member is not disposed among the plurality of through holes, by irradiating the first surface with an energy ray while applying a voltage to the substrate.

5. The sample ionization method according to claim 4, wherein in the third step, the sample support is peeled off from the sample before the component attached to the substrate is dried.

6. A mass spectrometry method, comprising:
each of the steps of the sample ionization method according to claim 4; and
a fifth step of detecting the component ionized in the fourth step.

* * * * *